United States Patent [19]

Calder et al.

[11] Patent Number: 5,432,531
[45] Date of Patent: Jul. 11, 1995

[54] COORDINATE PROCESSOR FOR A COMPUTER SYSTEM HAVING A POINTING DEVICE

[75] Inventors: Gary J. Calder, Eastleigh; Gavin D. Beardall, Alresford, both of England

[73] Assignee: International Business Machines Corporation, Armonk, N.Y.

[21] Appl. No.: 772,503

[22] Filed: Oct. 7, 1991

[30] Foreign Application Priority Data

Dec. 14, 1990 [GB] United Kingdom ............... 90313657

[51] Int. Cl.$^6$ ............................................. G09G 3/02
[52] U.S. Cl. ..................................... 345/173; 345/145
[58] Field of Search ............... 345/173, 174, 175, 176, 345/177, 178, 157, 156, 162, 172; 178/18, 19

[56] References Cited

U.S. PATENT DOCUMENTS 4,914,624  4/1990  Dunthorn ............................ 364/900
5,119,075  6/1992  Smith .................................. 345/173

FOREIGN PATENT DOCUMENTS

0156593  3/1985  European Pat. Off. ..... G06K 11/06
2152250  7/1985  United Kingdom ......... G06F 3/033

Primary Examiner—Ulysses Weldon
Assistant Examiner—Xiao M. Wu
Attorney, Agent, or Firm—Martin J. McKinley; Joseph C. Redmond

[57] ABSTRACT

A coordinate processor for a computer system having an absolute position pointing device (10) such as a touch sensitive display screen comprises stimulus detection means (200) for detecting a tactile stimulus of an absolute position pointing device (10) and directed to a point within a data display area (610) of a computer system. The processor further comprises coordinate locking means (210-320) for locking a current cursor position to the point within the display area corresponding to the tactile stimulus in response to said stimulus exceeding a predetermined threshold value. The processor permits the computer system to distinguish a stimulus of the pointing device (10) for repositioning the cursor within the data display area (610) from a stimulus of the pointing device (10) for issuing a button click command to the computer system. The processor may be embodied in an electronic logic circuit within a pointing device adapter portion of the computer system. Equally, the coordinate processor may be in the form of a central processing unit operating under the control of a computer program.

12 Claims, 5 Drawing Sheets

COORDINATE PROCESSOR FOR A COMPUTER SYSTEM HAVING A POINTING DEVICE

FIELD OF INVENTION

The present invention generally relates to apparatus and methods for computer input devices, and more particularly to a coordinate processor for a computer system having a pointing device such as a touch sensitive display screen.

DESCRIPTION OF PRIOR ART

Many widely available computer systems such as the IBM PS/2 Model 70 (IBM and PS/2 are trademarks of IBM Corporation) are capable of receiving and processing data generated by a pointing device such as a mouse, tracker ball or touch sensitive display screen. The pointing device enables a user of the computer system to move, with a simple hand movement, a cursor between points within a data display area of a visual display unit.

A relative displacement pointing device such as a mouse or tracker ball provides the computer system with a vector which identifies the location within the data display area to which the cursor is to be moved relative to the current location of the cursor. The vector is generated by manipulating of the pointing device to achieve a desired cursor movement.

An absolute position pointing device such as a touch sensitive display screen provides the computer system with two dimensional coordinates identifying a point within the data display area to which the cursor is to be moved. In a touch sensitive display screen, the coordinates are generated by touching the screen at the point to which the cursor is to be moved.

In general, relative displacement pointing devices are also provided with at least one manually operable push button. The button can be operated by the user in a number of different modes and the computer system can be configured to respond differently to each mode of operation of the button. For example, the computer system may be configured to manipulate a window of displayed data within the data display area when the button is depressed as the pointing device is moved. Equally, the computer system may be programmed to perform another task when the cursor is placed on an icon representing the task within the display area and the button is depressed and released in rapid succession or "clicked". The computer system may also be configured to perform yet another task when the cursor is placed on an icon and the button is clicked twice or "double-clicked".

Touch screens are not generally provided with a manually operable push button. A button click command may however be issued via a touch screen by applying an corresponding sequence of touch stimuli to the touch screen within a predetermined time period. However, it will be appreciated that if each stimulus in the sequence is applied to a different point within a target area of the screen, then the computer system may fail to distinguish the button click command from a request to move the cursor from one point to another. In general therefore, absolute position pointing devices have been thought of as unsuitable for issuing button click commands. Many commercially available application software packages have therefore been written with relative displacement pointing devices in mind. Such packages can therefore be wholly, or at least partially, incompatible with computer systems having absolute position pointing devices.

SUMMARY OF THE INVENTION

An aim of the present invention is therefore to provide a coordinate processor which enables a computer system comprising an absolute position pointing device to operate in the same manner as a computer system having a relative displacement pointing device.

In accordance with the present invention, there is now provided a coordinate processor comprising: stimulus detection means for detecting a tactile stimulus of an absolute position pointing device and directed to a point within a data display area of a computer system; characterised in that the processor further comprises: coordinate locking means for locking a current cursor position to the point within the display area corresponding to the tactile stimulus in response to said stimulus exceeding a predetermined threshold value.

This advantageously enables the computer system to distinguish between cursor movement commands and button click commands issued via an absolute position pointing device without requiring a separate, manually operable push button. An operator of such a computer system can therefore fully exploit application software packages designed for operation with relative displacement pointing device without any perceptible degradation in performance of the computer system. Specifically, the coordinate processor enables the computer system to lock the position of the cursor onto a particular coordinate when a stimulus which may signal a button click command is detected. If however, a button click command is not subsequently detected, the cursor is automatically unlocked.

Preferably, the coordinate locking means further comprises first reset means for releasing the cursor for movement within the data display area upon detection of a predetermined button click command.

The coordinate locking means of a preferred embodiment of the present invention further comprises second reset means for releasing the cursor for movement within the data display area upon expiry of a predetermined timeout period.

In addition, the coordinate locking means preferably further comprises third reset means for releasing the cursor for movement within the data display area upon detection of a subsequent tactile stimulus of the pointing device directed to a point outside a predetermined subarea of the data display area. Preferably, the subarea is predetermined by the computer system to be commensurate in size with an graphical icon generated within the display area by the computer system.

Viewing the present invention from a second aspect, there is now provided a coordinate processor comprising: stimulus detection means for detecting a stimulus applied to an absolute position pointing device and directed to a point within a data display area defined by a computer system; characterised in that the processor further comprises: command distinguishing means responsive to the stimulus detection means to distinguish a stimulus of the pointing device for repositioning a cursor within the data display area from a stimulus of the pointing device for issuing a button click command to the computer system.

Preferably, the command distinguishing means can be manually preset to identify either a tactile stimulus of the pointing device for issuing a single button click command to the computer system, or a tactile stimulus of the pointing device for issuing a multiple button click command to the computer system.

In a preferred embodiment of the present invention to be described later, there is provided a coordinate processor comprising: first receiver means for receiving from an absolute position pointing device an input two dimensional coordinate data value corresponding to a point within a data display area of a computer system and generated by the pointing device in response to a stimulus manually applied to the pointing device; second receiver means for receiving from the pointing device a force data value corresponding to the input coordinate data value and generated by the pointing device in response to the stimulus; characterised in that the processor further comprises: coordinate locking means for setting a lock coordinate data value to the input coordinate data value in response to the force data value exceeding a predetermined threshold value; coordinate setting means for setting one or more further input coordinate force data values to the lock coordinate data value in response to any one of the further input coordinate data values falling within a predetermined range of coordinate data values during a predetermined time period; first reset means for resetting the lock coordinate data value in response to at least one discrete stimulus of the pointing device generating a force data value greater than the predetermined threshold value.

DESCRIPTION OF DRAWINGS

A preferred embodiment of the present invention will now be described, by way of example only with reference to the accompanying drawings in which.

DESCRIPTION OF PREFERRED EMBODIMENT

Figure 1:
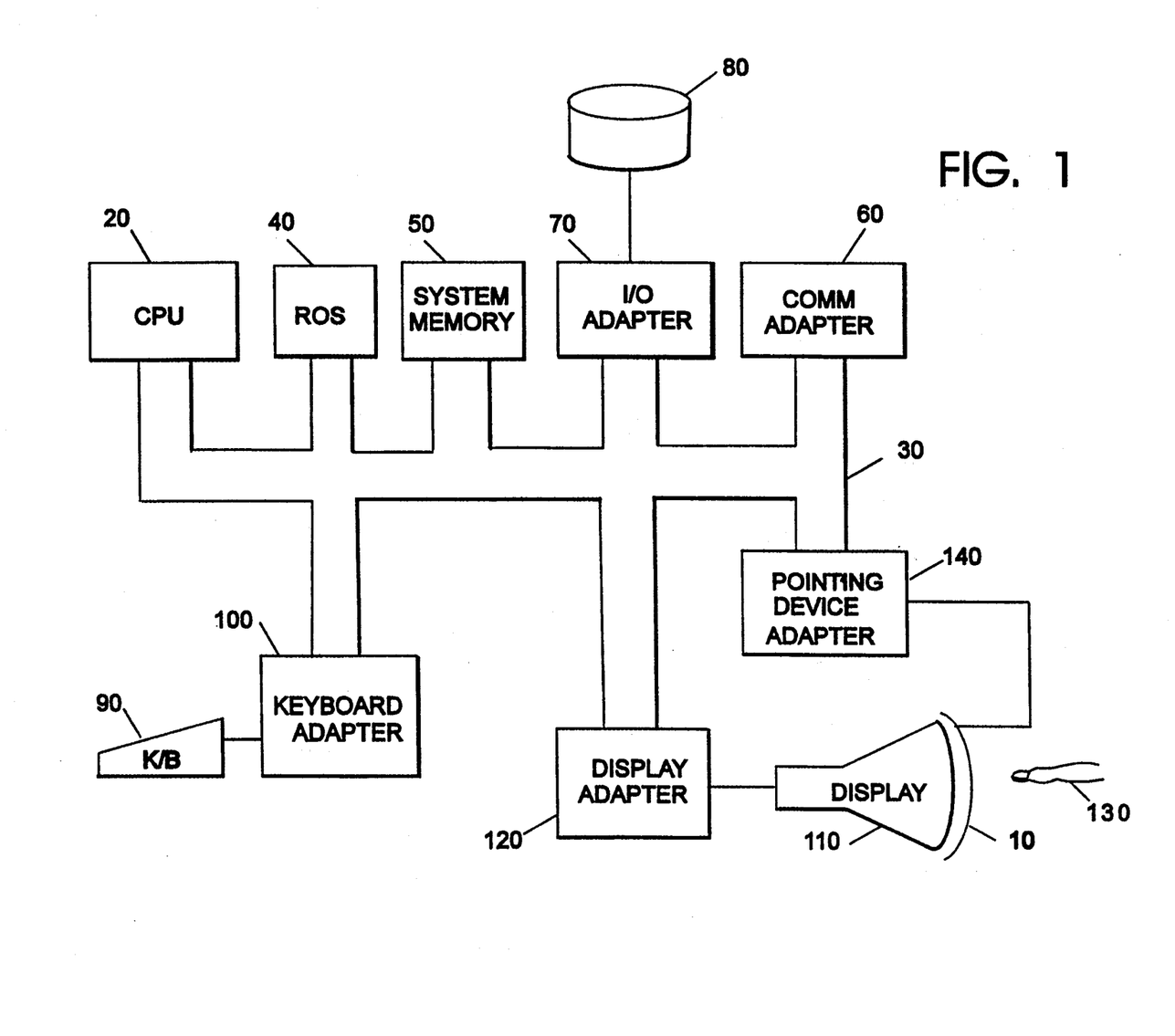
FIG. 1 is a block diagram of a computer system comprising an absolute position pointing device in the form of a touch-sensitive visual display screen.

FIG. 1 illustrates an example of a computer system for processing input data from an absolute position pointing device. The system comprises a central processing unit (CPU) 20 for executing programmed instructions involving the input data. A bus architecture 30 communicates data between the CPU and other components of the computer system. A read only memory (ROS) 40 provides secure data storage. A random access system memory 50 provides temporary data storage. Data communication with other computer systems (not shown) is provided by a communications (COMM) adapter 60. An input/output (I/O) adapter 70 permits data communication between the bus architecture and a peripheral device such as a hard disk file 80. A visual output from the computer system in the form of a data display area is generated on a display device 110 by a display adapter 120. A user can operate the computer system using a keyboard 90 linked to the bus architecture via a keyboard adapter 100. By way of alternative to keyboard 90, an absolute position pointing device in the form of a touch sensitive display screen 10 is superimposed on display device 110. The touch screen 10 is responsive to a touch stimulus 130 applied by the user to issue a command to the computer system. The command may instruct the computer system to move a cursor between points within the data display area. Alternatively, the touch screen may be employed to issue a button click command instructing the computer system to an operation corresponding to the current position of the cursor in the display area.

The touch screen 10 is resolved by digitising circuitry (not shown) in a pointing device adapter 140 into a two dimensional array of discrete coordinate points. A touch stimulus applied to any one of the coordinate points is detected by a sensor array (not shown) in the touch screen 10. The sensor array generates an analog signal proportional to the force imparted to the touch screen by the stimulus. The signal is digitised by a sampling analogue to digital convertor (ADC) circuit (not shown) in the touch screen 10 to produce a input data value. The input data value, together with the coordinates to which it relates, are transmitted from the touch screen to the pointing device adapter 140. The input data value corresponding to each set of coordinates is typically refreshed by the ADC circuit sixty times a second. The pointing device adapter 140 connected to the bus architecture 30 passes each set of coordinates and the corresponding input data value to the bus architecture 30.

Figure 2:
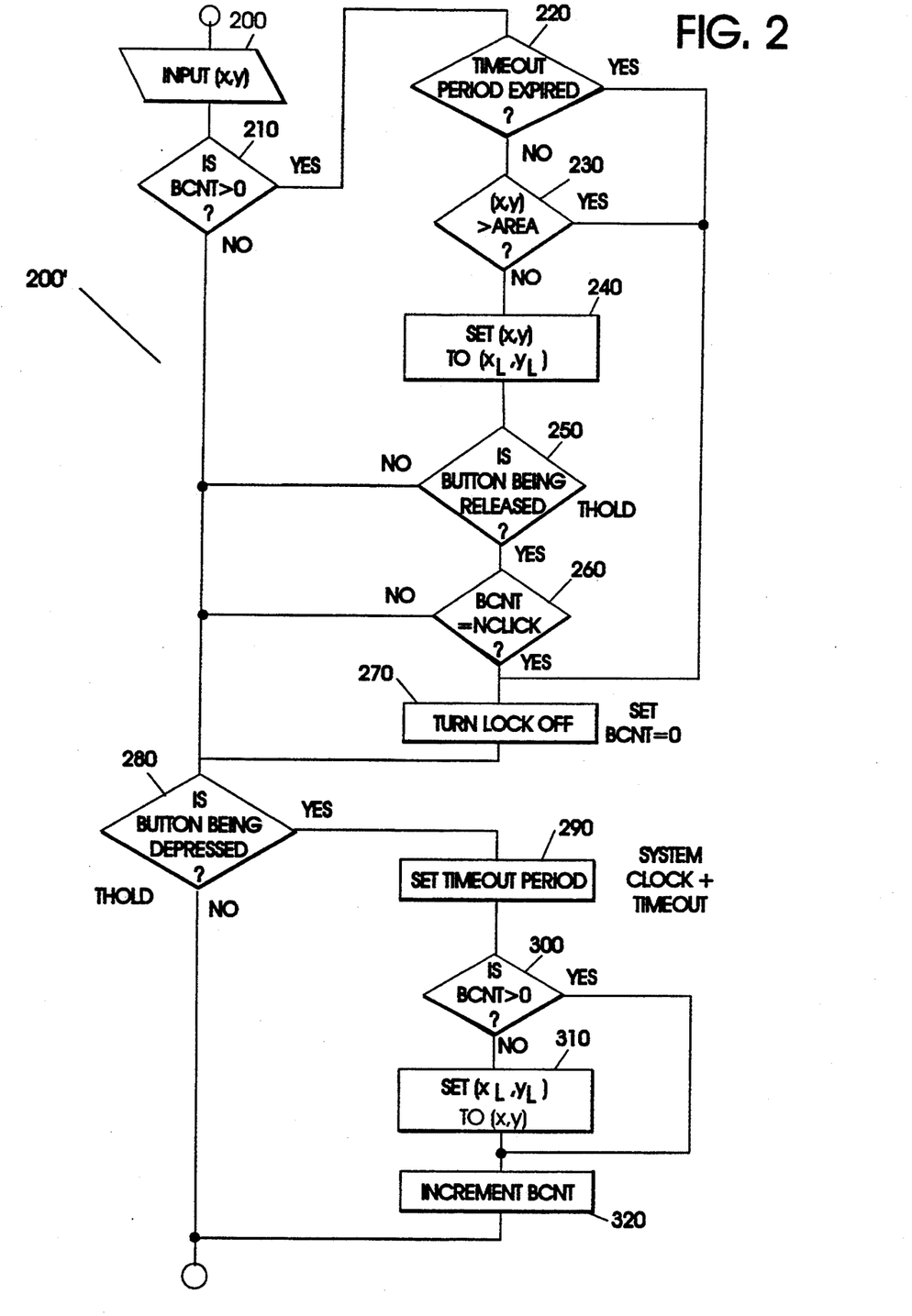
FIG. 2 is a block diagram of a coordinate processor of the present invention in the form of a flow chart.

Referring now to FIG. 2, a coordinate processor 200' of the present invention distinguishes stimuli applied to the touch screen 10 to issue button click commands from stimuli to move the cursor within the display area. It will be appreciated that the coordinate processor of the present invention may be embodied in a hardwired electronic logic circuit within the pointing device adapter 140 or the touch screen 10. However, it will also be appreciated that, in other preferred embodiments of the present invention, the coordinate processor may be in the form of a processing unit such as CPU 20 operating under the control of a computer program.

The coordinate processor comprises an input stage 200. The input stage 200 sequentially reads the sampled input data value corresponding to each set of coordinates (x,y) of the touch screen 10 in turn. The coordinate processor increments a running total of button clicks BCNT each time a button click is detected. Initially BCNT is zero.

A count detect stage 210 checks BCNT for each input data value (x,y)n received from input stage 200. If BCNT corresponding to coordinates (x,y) is zero, then a depress detect stage 280 determines whether or not the corresponding input data value has increased above a predetermined button threshold value, THOLD.

If no such increase is detected, coordinates (x,y) are passed from coordinate processor to the computer system to control the positioning of the cursor within the display area. The next input data value is then received by input stage 200.

If, however, the input data value has increased over and above THOLD, then a timer stage 290 sets a timeout period, TIMEOUT which is equal to a current system clock value plus a predetermined value. In a preferred embodiment of the present invention, the timeout period can be manually adjusted about a nominal preset centre value of 500 ms. Another count detect stage 300 then determines again whether or not BCNT is zero.

If BCNT is zero, then a coordinate locking stage 310 sets a pair of lock coordinates (xL,yL) to coordinates (x,y).

If BCNT is not zero, the lock coordinates (xL,yL) retain their existing values. In either case, coordinates (x,y) are then passed to the computer system to control cursor positioning. A counter 320 then increments BCNT and the next input data value (x',y')n corresponding to coordinates (x',y') is received by input stage 200.

If count detect stage 210 determines that BCNT is greater than zero for input data value (x',y')n, timer stage 220 indicates whether or not the timeout period has been exceeded.

If the timeout period has been exceeded, then a reset stage 270 resets BCNT to zero before (x',y')n is passed to depress detect stage 280.

If the timeout period has not been exceeded, then an location check stage 230 determines whether or not coordinates (x',y') are outside a predetermined coordinate locking area, AREA, of the data display area. If coordinates (x',y') are outside AREA, then reset stage 270 resets BCNT before the (x',y')n is passed to depress detect stage 280.

If coordinates (x',y') are within AREA, then a lock stage 240 replaces coordinates (x'y') corresponding to input data value (x',y')n with the lock coordinates (xL,yL). Release detect stage 250 then detects whether or not input data value (x',y')n has decreased to below THOLD. If no such decrease is detected, then input data value (x',y')n, now corresponding to lock coordinates (xL,yL), is passed to depress detect stage 280. The cursor position is now locked to the lock coordinates (xL,yL).

If input data value (x',y')n has decreased over and below THOLD, then count detect stage 260 determines whether or not BCNT is equal to a predetermined click value, NCLICK.

In a particularly preferred embodiment of the present invention, NCLICK can be manually selected by the operator to detect different button click commands. For example, setting NCLICK to two configures the coordinate processor to detect both double and single click commands. Alternatively, setting NCLICK to one configures the cooordinate processor to detect only single click commands.

If BCNT is equal to NCLICK, the button click command has been detected. BCNT is therefore reset to zero and input data value (x',y')n is passed to depress detect stage 280. The next input data value, (x",y")n corresponding to coordinates (x",y"), is then received by input stage 200.

Figure 3:
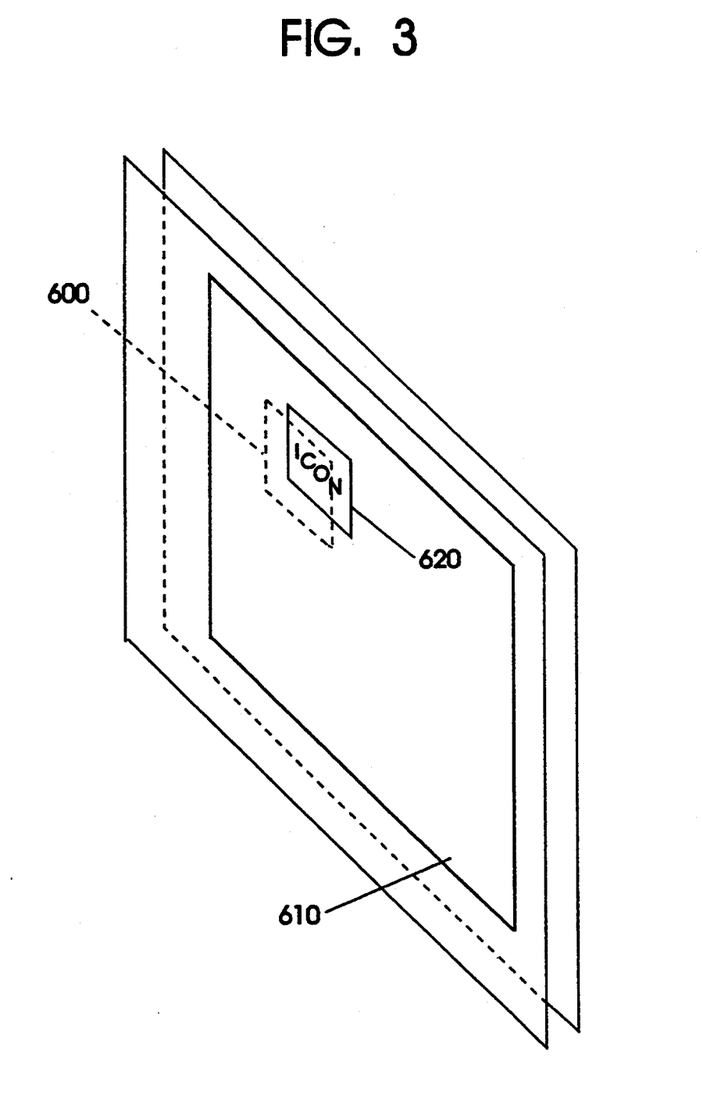
FIG. 3 is a front view of a touch sensitive display screen displaying an icon within a data display area.

In a preferred embodiment of the present invention, predetermined values TIMEOUT, AREA, THOLD, and NCLICK are supplied to the coordinate processor by CPU 20 under the control of an application software program. In particular, with reference to FIG. 3, AREA is preferably selected to represent an area 600 of size and location commensurate with an icon 620 representing graphically, within the data display area 610, a push button or the like. Preferably, the computer system is configured by the software so that the operator can select a particular program option by issuing a click command via touch screen 10 at the position of the icon within the display area.

Figure 4:
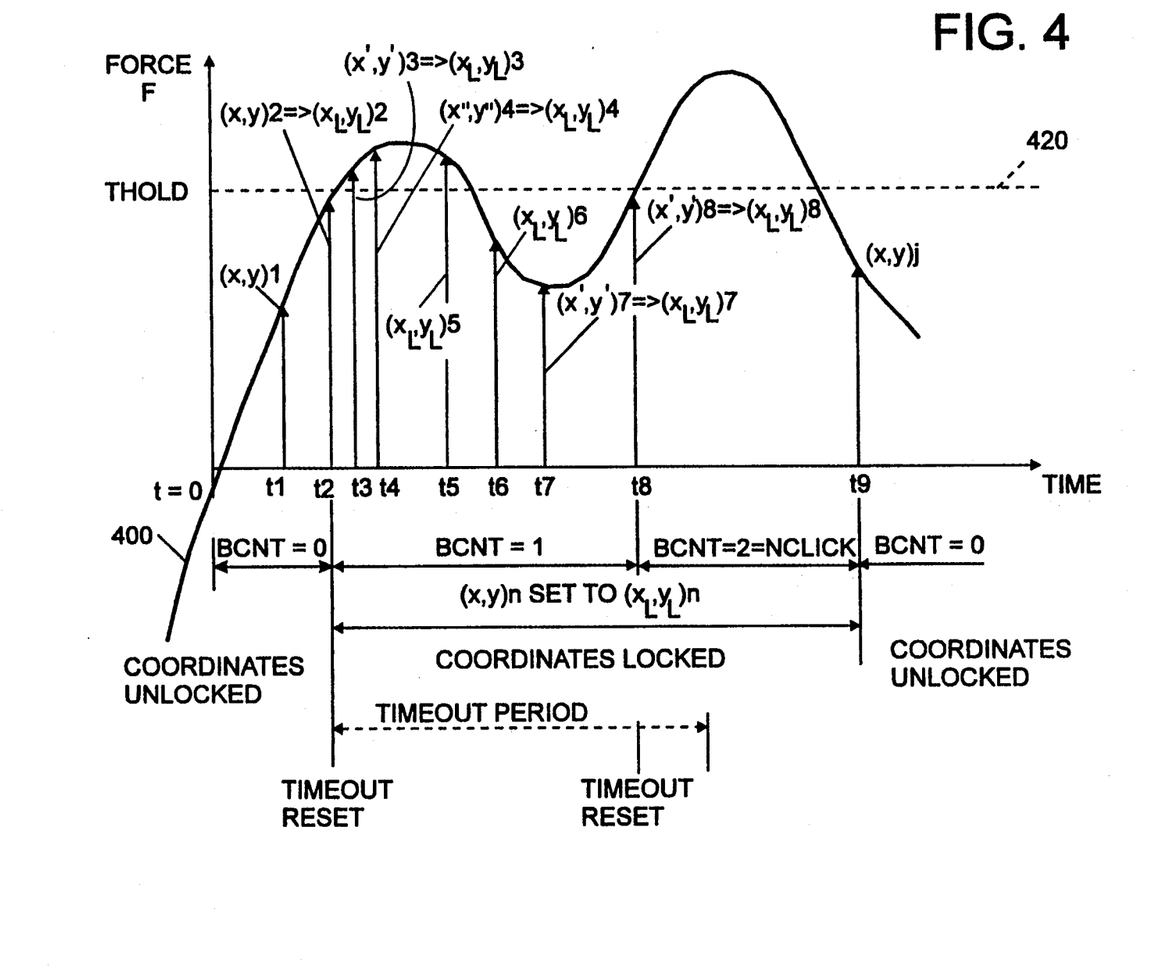
FIG. 4 is a waveform diagram corresponding to tactile stimuli representative of a double click command.

Referring now to FIG. 4, a double click command can be represented in the form of a curve 400 of tactile force applied to touch screen 10 with respect to time. Button threshold THOLD is represented by reference line 420. Initially, BCNT is set to zero, NCLICK is set to 2, and TIMEOUT, AREA, and THOLD are set to appropriate values by the application software.

Initial tactile contact with touch screen 10 is made at time t0 where curve 400 is coincident with reference line 410.

At time t1, input data value (x,y)1 at coordinates (x,y) is lower than THOLD. However, at time t2, input data value (x,y)2 at coordinates (x,y) is greater than THOLD. Depress detect stage 280 therefore indicates that the button is being depressed, and the timeout period is initialised by timer stage 290. Lock coordinates (xL,yL) are now set to coordinates (x,y). BCNT is incremented to indicate that the position of the cursor within the display area are now locked to the lock coordinates (xL,yL). Therefore, if the next force data values (x',y')3 at time t3 and (x",y")4 at time t4, correspond to coordinates (x',y') and (x",y") within the confines of AREA, then coordinates (x'y') and (x",y") are both replaced by lock coordinates (xL,yL).

It will be appreciated that if either (x',y') or (x",y") fall outside AREA then BCNT would reset to zero thereby unlocking the cursor position.

At time t5, input data value (x,y)5 is just greater than THOLD. However, at time t6, input data value (x,y)6 is lower than THOLD. Release detect stage 260 therefore indicates that the button is being released. However, BCNT does not equal NCLICK. BCNT is therefore not reset to zero. Therefore coordinates (x',y') corresponding to input data value (x',y')7 at time t7 are also replaced by lock coordinates (xL,yL). The cursor position is therefore still locked.

At time t8, input data value (x',y')8 is greater than THOLD. The timeout period is therefore initialised again by time stage 290. BCNT is incremented to indicate that a second button click has been detected. Lock coordinates (xL,yL) remain set to coordinates (x,y) originally corresponding to input data value (x,y)2. The cursor therefore remains locked to (x,y) within the display area.

At time t9, input data value (x,y)9 is lower than THOLD. Therefore release detect stage 250 indicates that the button is being released. BCNT is now equal to NCLICK indicating that a double click command has been detected. BCNT is now reset to zero to unlock the cursor position. The next touch stimulus producing a input data value greater than THOLD will therefore refresh lock coordinates (xL,yL).

It will be appreciated that BCNT will also be reset to zero if it is maintained at a value greater than zero for a period greater than the timeout period. Similarly, BCNT will be reset to zero if any input stimulus is applied at a coordinate outside AREA.

A coordinate processor of the present invention therefore permits the operator to issue a double click command to a computer system via a touch sensitive display screen by locking the cursor position to a position within the display area at which an applied touch stimulus is of a magnitude exceeding a threshold value. The cursor position is unlocked when the prescribed number of clicks identifying the command is detected. Alternatively, the cursor position is unlocked if a subsequent stimulus is applied to the touch screen outside a predetermined area of the touch screen. Furthermore, the cursor position is also unlocked if the delivery of the command extends beyond a predetermined timeout period. It will therefore be appreciated that the coordinate processor of the present invention provides the operator of the computer system with freedom at all times to move the cursor to any point within the display area. Simultaneously however, the coordinate processor of the present invention enables the operator to issue via the touch screen a button click command to the computer system which is independent of any cursor movement command.

Figure 5:
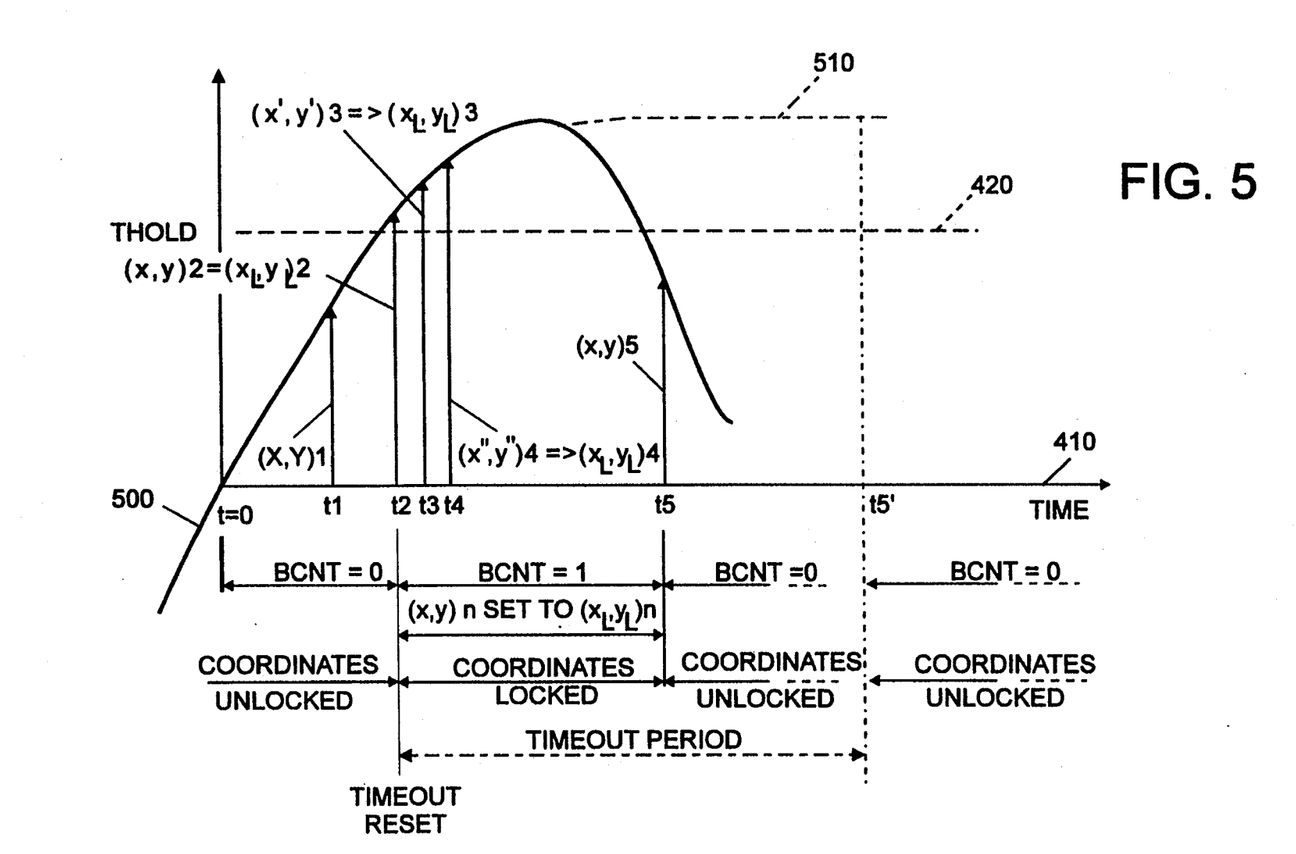
FIG. 5 is a waveform diagram corresponding to a tactile stimulus representative of a single click command.

Referring now to FIG. 5, a single click command can be represented in the form of a curve 500 of tactile force applied to the touch screen 10 with respect to time. Button threshold THOLD is represented by reference line 420. Initially, BCNT is set to zero and NCLICK is set to 1. TIMEOUT, AREA, and THOLD are set to appropriate values by an application software program.

Initial tactile contact is made with the touch screen 10 at time t0 where curve 500 is coincident with reference line 410.

At time t1, input data value (x,y)1 corresponding to coordinates (x,y) is lower than THOLD.

At time t2 however, input data value (x,y)2 corresponding to coordinates (x,y) is greater than THOLD. Depress detect stage 280 therefore indicates that the button is being depressed and the timeout period is initialised by timer stage 290. Lock coordinates (xL,yL) are now set to coordinates (x,y) and BCNT is incremented. The cursor position is now locked to coordinates (x,y).

If coordinates (x',y') and (x",y"), corresponding to force data values (x',y')3 at time t3 and (x",y")4 at time t4, are within the confines of AREA, then (x',y') and (x",y") are both replaced by lock coordinates (xL,yL). The cursor position is therefore locked at coordinates (x,y).

If either (x',y') or (x",y") are outside AREA then BCNT will be reset to zero and the next input data value to exceed THOLD will refresh lock coordinates (xL,yL) and relock the cursor position.

At time t5, input data value (x,y)5 is lower than THOLD. Therefore, release detect stage 260 indicates that the button is being released. BCNT now equals NCLICK indicating that the single click command has been detected. BCNT is now reset to zero. Therefore, the next input data value to exceed THOLD will refresh lock coordinates (xL,yL).

It will now be appreciated that a coordinate processor of the present invention also enables the operator of the computer system to issue a single click command to the a computer system via a touch sensitive display screen. In addition however, a coordinate processor of the present invention also enables the operator to issue cursor movement command to the computer system through the touch screen independently of button click commands.

Specifically, the coordinate processor of the present invention locks the cursor position to a point on the touch screen at which an applied touch stimulus has a magnitude exceeding a threshold value. The cursor position is unlocked when the button click command is detected, or if a subsequent stimulus is outside a predetermined area of the touch screen. The cursor position is also unlocked if the delivery of the command extends beyond a predetermined timeout period. It will therefore be appreciated that the cursor may be freely moved to any point within the display area depending on whether or not the operator wishes to complete delivery of the button click command.

Curve 510 illustrates a continuous tactile stimulus of the touch screen applied initially at time t0. BCNT is initially set to zero.

At time t1, input data value (x,y)1 corresponding to coordinates (x,y) is lower than THOLD. However, at t2, input data value (x,y)2 corresponding to coordinates (x,y) is greater than THOLD. Therefore, depress detect stage 280 indicates that the button is being depressed and the timeout period is initialised.

Lock coordinates (xL,yL) are now set to coordinates (x,y) and BCNT is incremented. The cursor position is now locked to (x,y).

At time t5, input data value (x,y)5 is not below THOLD. Therefore, if no stimulus has been applied to the touch screen outside AREA at time t5, BCNT is not reset. The cursor position remains locked to coordinates (x,y).

At time t5' however, the timeout period expires. BCNT is therefore reset to zero. The cursor position is therefore unlocked. The next touch stimulus exceeding THOLD will thus refresh lock coordinates (xL,yL).

A coordinate processor for a computer system having touch sensitive display screen has now been described by way of example of the present invention. It will however be appreciated that the present invention is equally applicable to other absolute position pointing devices such as, for example, tablets.

Applicants claim:

1. A coordinate processor for distinguishing between cursor movement commands for a display and button click commands for a relative displacement pointing device comprising:
   stimulus detection means (200) for detecting a single tactile stimulus of an absolute position pointing device (10) exceeding a force threshold within a preselected time period and directed to a point within a data display area (610) of a computer system for forming a pushbutton within a subarea of the display area at the point of the stimulus;
   characterized in that the processor further comprises:
   coordinate locking means (210–320) for locking a current cursor position to the point within the display area corresponding to the tactile stimulus in response to said stimulus exceeding a predetermined threshold value;
   command distinguishing means responsive to the stimulative detection means to distinguish a stimulus of the pointing device for repositioning the cursor within the data display area from a stimulus of the pointing device for issuing a button click command to the computer system;
   means for issuing one or more button click commands;
   means for counting button click commands to lock the cursor position when a prescribed number of clicks identifying the command is detected; and
   means for comparing the counted click commands to a present number for release of the cursor when the counted clicks equal the present number.

2. A processor as claimed in claim 1 wherein the coordinate locking means (210–320) further comprises:
   first reset means (260,270) for releasing the cursor for movement within the data display area (610) upon detection of a predetermined button click command.

3. A processor as claimed in claim 2 wherein the coordinate locking means (210–320) further comprises:

second reset means (290,220,270) for releasing the cursor for movement within the data display area (610) upon expiry of a predetermined timeout period.

4. A processor as claimed in claim 3 wherein the coordinate locking means (210–320) further comprises:
third reset means (230,270) for releasing the cursor for movement within the data display area (610) upon detection of a subsequent tactile stimulus of the pointing device (10) directed to a point outside a predetermined subarea (600) of the data display area (610).

5. A processor as claimed in claim 4 wherein the subarea (600) is predetermined by the computer system to be commensurate in size with a graphical icon (620) generated within the display area (610) by the computer system.

6. A processor as claimed in claim 5, wherein the coordinate locking means (210–320) can be manually preset to identify a tactile stimulus of the pointing device (10) for issuing a single button click command to the computer system.

7. A coordinate processor as claimed in claim 6 wherein the coordinate locking means (210–320) can be manually preset to identify a tactile stimulus of the pointing device (10) for issuing a multiple click command to the computer system.

8. A processor as claimed in claim 5 wherein the coordinate locking means (210–320) is responsive to a digital input value corresponding to the force of the tactile stimulus.

9. A processor as claimed in claim 5 wherein the absolute pointing device (10) is a touch sensitive display screen (10).

10. A method of operating an absolute position pointing device as a relative displacement pointing device in a computer system including a coordinate processor (200'), a display area (610) and a touch screen (10) using a single tactile stimulus exceeding a force threshold within a preselected time period to form a pushbutton within a sub area (600) of the display area (610) at the point of the stimulus, comprising the steps of:
a) supplying predetermined values of TIMEOUT, AREA, THOLD, NCLICK to an input (200) for installation in signal processing elements (220), (230), (260), (280), respectively;
b) setting a button click counter (210) to zero "0" for button clicks BCNT;
c) setting and storing a predetermined number of clicks and comparing the counted clicks with the predetermined number for release of a cursor when the counted clicks equal the predetermined number;
d) sequentially sampling an input signal (400), (500) definitive of tactile contact and location on a touch screen (10) in terms of signal magnitude; orthogonal coordinates x, y, and time periods 1 ... j, where j is the last sample in signal (400), (500);
e) passing the input signal to element (280) if BCNT in counter (210) is zero; the element (280) comparing the signal magnitude at n=1 to a signal threshold THOLD;
f) passing the input signal to a timer stage (220), if BCNT is greater than 0 in counter (210)|x, y|n=1, the timer stage (220) indicating whether the time out period has been exceeded; if exceeded and a predetermined number of clicks have been counted, a reset stage (270) resets BCNT to 0 in elements (210) and (310) before passing the coordinates to element (280) for processing in accordance with steps d and e; and
g) processing succeeding process signal input sample |x', y'|n=j in accordance with steps e) through f).

11. The method of claim 10 wherein step e) comprises the steps of:
e1) if the signal magnitude is less than THOLD, the x, y coordinates at n=1 are passed to the computer system to control the position of a cursor within a display area (600) of a display (110): and
e2) if the signal magnitude exceeds THOLD, a timer stage(290) sets a timeout period for a coordinate locking stage (310) which sets a pair of lock coordinates (x1,y1) for coordinates |x, y|n=1 which are passed to the cursor.

12. The method of claims 10 or 11 wherein step f) comprises the steps of:
f1) if the timeout period in element (220) has not been exceeded, a location check stage (230) determines whether coordinates |(x, y)| n=1 are outside the AREA (600); if the coordinates are within the AREA, the |x,y|n=1 are replaced by coordinates |x1, y1| in an element (240) and supplied to a release stage (250);
f2) the release stage (250) detects whether the signal magnitude is below THOLD, if above THOLD, the signal is passed to element (280) for processing per d and e; if below THOLD, the signal is passed to a count detect stage (260); and
f3) the count detect stage (260) determines whether BCNT is equal to NCLICK; if equal, BCNT is reset to 0 by element (270) and the coordinates |x, y,|n=1 are passed to element (280) or if not equal, the coordinates |x, y,|n=1 are passed to element (280) which processes the coordinates per steps d and e.

* * * * *